June 11, 1968            D. F. O'BRIEN            3,388,318

HALL EFFECT CONSTANT POWER REGULATOR

Filed July 30, 1963            2 Sheets-Sheet 1

DONALD F. O'BRIEN
INVENTOR.

BY

ATTORNEY

United States Patent Office 3,388,318
Patented June 11, 1968

3,388,318
HALL EFFECT CONSTANT POWER REGULATOR
Donald F. O'Brien, Watertown, Mass., assignor to Onnetics, Inc., Boston, Mass., a corporation of Massachusetts
Filed July 30, 1963, Ser. No. 298,699
9 Claims. (Cl. 323—20)

ABSTRACT OF THE DISCLOSURE

A constant current power regulator utilizing a Hall effect device to sense the instantaneous voltage and current applied to a load. The output of the Hall effect device is a voltage that is proportional to the instantaneous power (the product of voltage X current) and which is then compared with a reference voltage to produce an error signal during those instances when the power applied to the load makes excursions beyond prescribed limits set by the reference voltage. The sense and magnitude of the error signal is utilized to control a regulator to bring the instantaneous power back to within specified limits.

---

This invention relates to electric power regulators and, more particularly, to an electric power regulating device having a feedback control loop and noted by its absence of mechanical linkages for controlling the alternating power input.

Electronic power regulators, that is, devices capable of supplying constant power to a load having a varying power requirement, have many applications in varied fields. Some important applications are, for example, in the welding and in motor starting arts.

In the case of welding, one of the present methods of providing a constant power involves the insertion of a constant current for a given period of time. The given period of time being the time required to produce an adequate bond between the two materials being joined. In the welding art, the varying load problem arises from the fact that the voltage across the bond changes drastically during the bonding process due to resistance changes. In any event, the change in resistance at the joint during the bonding process, which brings about variations in the power demands, is a situation that can best be obviated by providing a constant power source during the welding cycle.

In the motor starting situation, when power is applied to a motor in a quiescent condition, for a very short period there is an excessive amount of power applied to overcome the inertia and Coulomb friction. Unless some provision is made to limit the applied power, the windings may easily carry more current than they are designed to carry and, as a result, create excessive heat and either short across the insulation or melt entirely.

Considering the problem of delivering constant power to a varying load, it will be seen that the load may be represented by a load resistor whose resistance will vary by a factor of 100 in the period that the power is applied. The basic formulae which will describe the relationship between the electrical variables in the load are $$P = EI$$

and $$E = IR$$

where
$P$ = applied power
$E$ = applied voltage
$I$ = applied current
$R$ = load resistance (an independent variable)

From these fundamental considerations, it is obvious that, if the instantaneous power delivered to the load is measured and a signal produced that is proportional to the instantaneous power, the proportional signal may then be compared to a reference signal whose magnitude is proportional to the value of power that it is desired to hold constant. Comparing the proportional signal with the reference signal will produce an error voltage that is proportional to the instantaneous deviation of the delivered power about the power level it is desired to hold constant. The error voltage may then be used to control the input power to the load and thus provide a feedback loop which will constantly monitor the power input. As will be seen, this regulator may take the form of either a series passing stage or a shunt stage, depending on whether or not it is desirable to control the delivered power by means of either voltage or current control.

Insofar as the prior art is concerned, it is my belief that nothing has been shown that even remotely resembles the subject invention. The prior art, to maintain constant power, usually provides a poorly regulated voltage supply in an endeavor to maintain good current regulation. By so doing, it is limited to narrow ranges of load resistance and cannot work if the variations in load resistance is greater than 10 to 1.

The same limitations also apply to poorly regulated current supplies.

Still another attempt of the prior art to provide constant power involves using two separate supplies, one of which has its voltage regulated while the other has its current regulated. This, too, has inherent disadvantages in that one is faced with two cumbersome systems that are each very expensive. The electrical drawbacks of using two supplies of this sort are that it will produce a tendency towards oscillation and instability. In any event, this combination also has a narrow range of operation; that is, changes in load resistance of the order of about 10 to 1 represent the limits. Still another drawback of this system is the fact that if one of the systems becomes inoperative, then excessive current or voltage becomes available to the detriment of the load.

Suffice to say, the subject invention is completely fail safe in that if either the current measuring portion or the voltage measuring portion becomes inoperative, the whole system would become inoperative, thereby protecting the load. In addition, it has been found that the response time to variations in resistance variations of the load is much lower in my device than in any device previously available.

Specifically, there is one prior art method of maintaining constant power which utilizes detecting changes in power about a given level and applying the changes to a servo motor, in the appropriate direction, so that the A.C. power in the primary circuit may be raised or lowered.

Still another prior art method involves detecting changes in current and applying the changes in current to a magnet having a given bias thereon. As the amount of magnetism is increased or decreased, a magnetizable arm, connected to a variable resistance is brought in or taken out to rebias a saturable reactor in the A.C. primary circuit of the power transformer, thereby controlling the A.C. input power.

The subject invention is devoid of any of these mechanical linkages and provides an instantaneous electrical feedback loop to control the D.C. power applied to the regulating device.

It is, therefore, a principal object of the present invention to provide a constant power device noted by its absence of mechanical linkages to the primary portion of the circuit.

Still another principal object of the present invention is to provide a constant power device noted by its absence of oscillation.

Yet another principal object of the present invention is to provide a constant power device having a higher frequency response than heretofore possible.

The features of my invention which I believe to be novel are set forth with particularity in the appended claims. My invention itself, however, both as to its organization and method of operation, together with further objects and advantages thereof, may be best understood by reference to the following description taken in conjunction with the accompanying drawings in which:

As will be hereinafter used, the word "combiner" will be used to denote any device which simultaneously samples both the current and the voltage instantaneously applied to the load and which has an electrical output that is proportional to the product of the instantaneous current and voltage supplied to the load. Thus, in this context, it will be seen that while this definition is satisfied by a Hall effect device, any other analog multiplier will suffice, such as a Wilby multiplier, quarter square multiplier, vacuum tube multiplier, etc. While the foregoing description will be slanted in terms of a Hall effect device, it will be obvious to those skilled in the art that my invention may be suitably modified to accommodate other applicable combiners.

Figure 1:
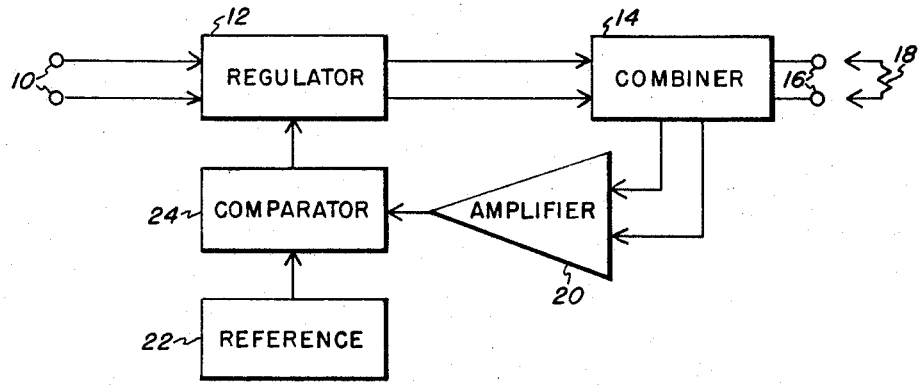
FIG. 1 is a block diagram of the basic invention.

Referring now to FIG. 1, there is shown a block diagram of the subject invention wherein input terminals 10 have direct current power (D.C.) from a filtered supply applied thereto. This D.C. is applied to a regulator 12, which may be either a series passing stage or a shunt stage depending on the preference of the operator and the ultimate use to which the device is being applied. The output of regulator 12 is applied as an input to combiner stage 14 which samples the power applied to load 18 shown here connected to output terminals 16. The sampled voltage output of combiner 14, which is proportional to the instantaneous power supplied to load 18, is applied to amplifier 20 where it is amplified and then applied as one input to comparator stage 24. The other input to comparator stage 24 is derived from reference 22 and the comparison of the two signals produces an error signal which is the output of comparator 24. It is this output error signal that is used to provide the bias for regulator stage 12, thereby regulating the D.C. power supplied to the load.

Since this invention will, for purposes of illustration, be described in terms of a Hall effect device combiner, it would be expedient to now describe a Hall effect device.

A Hall effect device comprises a Hall plate, typically made of indium arsenide or gallium arsenide, and which exhibits the Hall effect; that is, when cut by a field flux through its thin dimension and threaded by a current flowing between two opposite edges, a voltage will appear across the conjugate edges. This voltage, at any instant, will be proportional to the product of the field flux and the input voltage, with the field flux being proportional to the current generating the field flux. As the flux and the input currents are unidirectional the output voltage will also be unidirectional. Characteristically, the Hall plate is positioned in the air gap of an electro-magnet having an energizing coil which produces the field flux.

Figure 2:
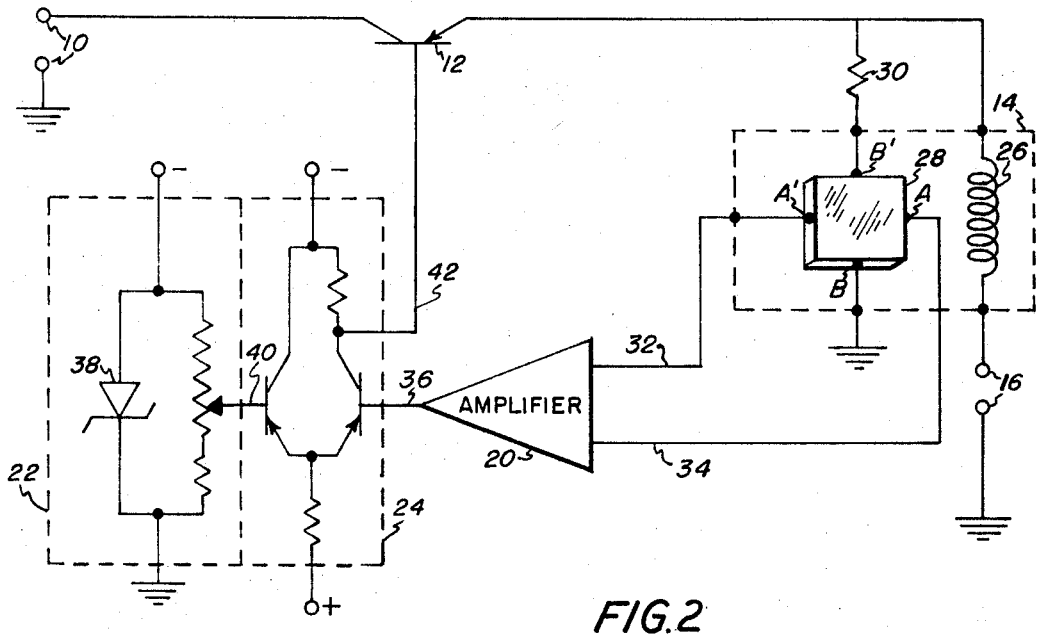
FIG. 2 is a schematic diagram of an operative embodiment of a series regulator which has been found to produce the desired regulation.

Referring now to FIG. 2, there is shown the schematic diagram which is an operative embodiment of a series regulator generic to the block diagram of FIG. 1. In this embodiment, D.C. power is applied as an input to terminals 10, one of which is indicated as being connected to ground. The other terminal supplies the D.C., through an appropriate lead, to the collector of passing transistor 12, the conduction of which is determined by the bias applied to the base. The emitter of transistor 12 is connected to the Hall effect device and, more specifically, to the flux energizing coil 26. The other end of coil 26 is connected to one of the regulated output terminals 16, the other terminal of which is connected to ground. Thus, the current passing through energizing coil 26 determines the flux density applied to the Hall plate 28. Similarly, one end of resistor 30 is connected to the emitter of passing transistor 12 and the other end is connected to terminal edge B' on one edge of the Hall plate. The opposite terminal edge B of the Hall plate is connected to ground to complete the voltage circuit. In this manner, the voltage appearing across terminals 16 has a portion thereof suitably dropped across resistor 30 and the remaining voltage appears across the Hall plate at terminal edges B–B'. Thus, the flux density which is determined by the current passing through energizing coil 26 is combined with the voltage appearing across the load, a portion of which appears across the Hall plate. This satisfies the need to sample the product of the instantaneous current and voltage applied to the load and also produces, across terminal edges A–A' on the Hall plate, a voltage that is proportional to the instantaneous power being consumed by the load at terminals 16. It is this voltage that is applied to amplifier 20 by means of leads 32 and 34.

Amplifier 20 is a straightforward D.C. (Direct Current) amplifier of standard design and, hence, no exegesis is necessary. The amplified output is applied by means of lead 36 as one input to comparator 24. The other input to comparator 24 is derived from reference circuit 22 which consists of a Zener diode 38 and a variable shunt resistor connected across a voltage source. The desired reference voltage is picked off the shunt resistor and applied via lead 40 as the second input to comparator 24. The output of comparator 24, which represents the error voltage, is applied via lead 42 to the base of passing stage 12. Thus, the error voltage appropriately sets the bias of regulator stage 12 in accordance with the information derived from the Hall plate 28 and the comparator to thereby regulate the power applied to the load.

Figure 3:
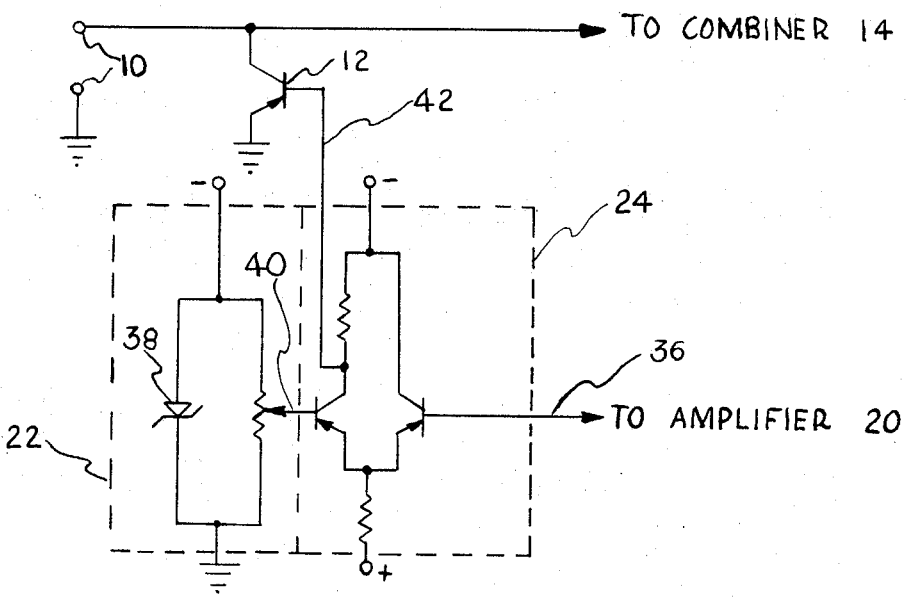
FIG. 3 is a schematic diagram of an operative embodiment of a shunt regulator which has been found to produce the desired regulation.

Referring now to FIG. 3, there is shown a schematic diagram which is an operative embodiment of a shunt regulator generic to the block diagram of FIG. 1 and where corresponding elements are similarly numbered. In this embodiment, D.C. is applied at the input to terminals 10, one of which, as indicated, is connected to ground. The other terminal supplies the D.C., through an appropriate lead, to both the collector of shunt regulator stage 12 and to combiner 14. The conduction of shunt regulator 12 is determined by the bias applied to the base thereof. As shown in both FIGS. 2 and 3, the amplified output of D.C. amplifier 20 is applied by means of lead 36 as one input to comparator 24, while the other input thereto is derived from reference circuit 22 consisting of Zener diode 28 and a variable shunt resistor connected across a voltage source. The desired reference voltage is picked off the shunt resistor and applied via lead 40 as the second input to comparator 24. The output of comparator 24, which represents the error voltage, is applied via lead 42 to the base of shunt regulator 12. Thus, in this embodiment too, the error voltage appropriately sets the bias of shunt regulator 12 in accordance with the information derived from combiner 14 and comparator 24 to, thereby, regulate the power applied to the load.

It will now become obvious to those skilled in the art that, while the foregoing discussion has been in terms of a direct current power regulator, it may be easily adapted to an alternating current power regulator.

While there has been described what is presently considered a preferred embodiment of the invention, it will be obvious to those skilled in the art that various changes and modifications may be made therein without departing from the inventive concept contained therein and it is, therefore, aimed in the appended claims to cover all

What is claimed is:

1. A power regulator comprising:
   filtered direct current power input means;
   regulator means having a pair of inputs and an output;
   means applying the filtered direct current power to one input of the regulator means;
   load means;
   combiner means having one input and a pair of outputs, one output of which senses the instantaneous power applied to the load;
   means applying the output of the regulator as an input to the combiner;
   comparator means;
   a source of reference voltage;
   means applying one combiner output to the load means; and
   means applying the other combiner output and the reference voltage to the comparator to compare the other combiner output with the reference voltage and to derive an error signal;
   means applying the error signal to regulator as the other input thereto to regulate the power applied to the load.

2. The device of claim 1 wherein the regulator means is a series passing stage.

3. The device of claim 1 wherein the regulator means is a shunt stage.

4. A power regulator comprising:
   filtered direct current power;
   regulator means having a pair of inputs and an output;
   means applying the filtered direct current power to one input of the regulator means;
   combiner means having one input and a pair of outputs;
   means applying the direct current power output of the regulator means to the combiner means input;
   load means;
   means applying one output of the combiner means to the load means;
   the combiner means providing at the other output a signal proportional in magnitude to the direct current power applied to the load;
   comparator means;
   a source of reference voltage;
   means applying the signal proportional in magnitude to the power applied to the load and the reference voltage to the comparator means to derive an error signal; and
   means applying the error signal to the other input of the regulator to regulate the direct current power applied to the load.

5. The device of claim 4 wherein the regulator means is a series passing stage.

6. The device of claim 4 wherein the regulator means is a shunt stage.

7. A power regulator comprising:
   filtered direct current power input means;
   regulator means having a pair of inputs and an output;
   means applying the filtered direct current power to one input of the regulator means;
   a Hall effect device combiner means having one input and a pair of outputs;
   means applying the direct current power output of the regulator means to the combiner means input;
   lead means;
   means applying one output of the combiner means to the load means;
   the combiner means providing at the other output a signal proportional in magnitude to the direct current power applied to the load;
   a source of reference voltage equal in magnitude to a desired signal;
   comparator means having an output and a pair of inputs;
   means applying the combiner signal to one comparator input and the reference voltage to the other input to derive an error signal; and
   means applying the error signal to the other regulator means input to regulate the power applied to the load.

8. The device of claim 7 wherein the regulator means is a series passing stage.

9. The device of claim 7 wherein the regulator means is a shunt stage.

References Cited

UNITED STATES PATENTS

| | | | |
|---|---|---|---|
| 3,176,215 | 3/1965 | Kusko | 323—94 X |
| 3,222,535 | 12/1965 | Engelhardt | 323—94 X |
| 2,550,492 | 4/1951 | Millar | 172—245 |
| 2,906,941 | 9/1959 | Brolin | 323—22 |
| 2,912,635 | 11/1959 | Moore | 322—25 |
| 2,996,655 | 8/1961 | Byles | 322—25 |
| 2,197,934 | 4/1940 | Koch | 323—4 |
| 2,942,172 | 6/1960 | Holtje | 321—18 |

JOHN F. COUCH, *Primary Examiner.*

WARREN E. RAY, *Examiner.*

A. D. PELLINEN, *Assistant Examiner.*